(12) United States Patent
Lai

(10) Patent No.: US 6,799,747 B1
(45) Date of Patent: Oct. 5, 2004

(54) SEALING STRUCTURE FOR AN OIL PIPE FEMALE COUPLER

(75) Inventor: Larry Lai, Tai Bao (TW)

(73) Assignee: Plum Industrial Co., Ltd. (TW)

( * ) Notice: Subject to any disclaimer, the term of this patent is extended or adjusted under 35 U.S.C. 154(b) by 0 days.

(21) Appl. No.: 10/714,629

(22) Filed: Nov. 18, 2003

(51) Int. Cl.$^7$ ................................................ F16L 29/00
(52) U.S. Cl. .............................. 251/149.6; 137/614.04; 251/359
(58) Field of Search .............................. 251/149.6, 359; 137/614, 614.04

(56) References Cited

U.S. PATENT DOCUMENTS 3,174,508 A * 3/1965 Zahuranec ............. 137/614.04
4,911,203 A * 3/1990 Garms .................... 137/614.04
6,016,835 A * 1/2000 Maldavs ..................... 137/614

* cited by examiner

Primary Examiner—Kevin Lee
(74) Attorney, Agent, or Firm—Stites & Harbison PLLC; Douglas E. Jackson

(57) ABSTRACT

A female coupler for a fueling structure includes a body, an oil seal with an annular wing, and a sealing member. A flange is formed on an inner periphery of the body and located adjacent to an open end of the body. An annular wall projects from a bottom wall of the sealing member. The oil seal is mounted inside the annular wall and includes an annular wing on a face thereof. The annular wing includes a top face and a bottom face. The top face and the bottom face of the oil seal are respectively pressed against by the annular wall of the sealing member and the flange of the body. A whole annular face of the open end of the body and the bottom wall of the sealing member are welded together by ultrasonic welding, providing dual leakage prevention.

1 Claim, 3 Drawing Sheets

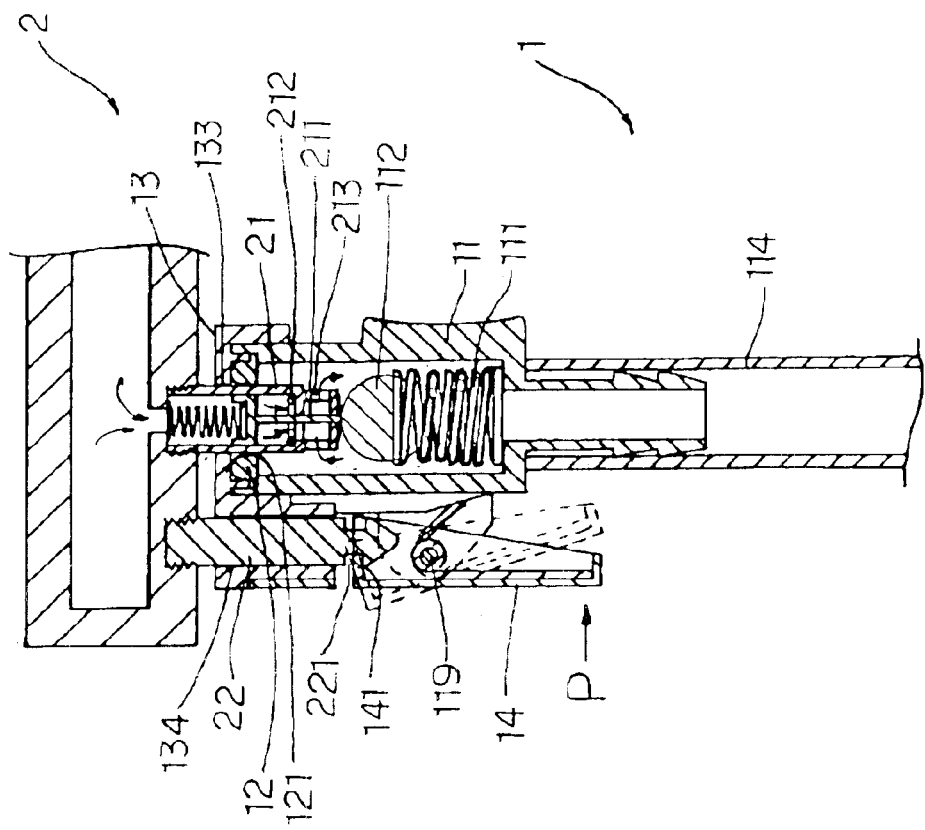
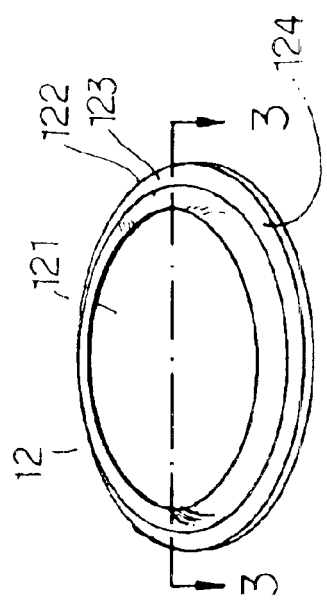
FIG. 2
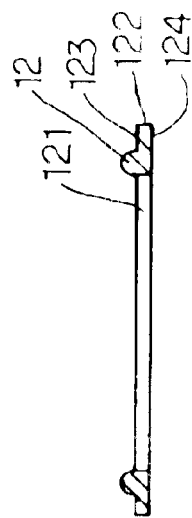
FIG. 3
FIG. 4

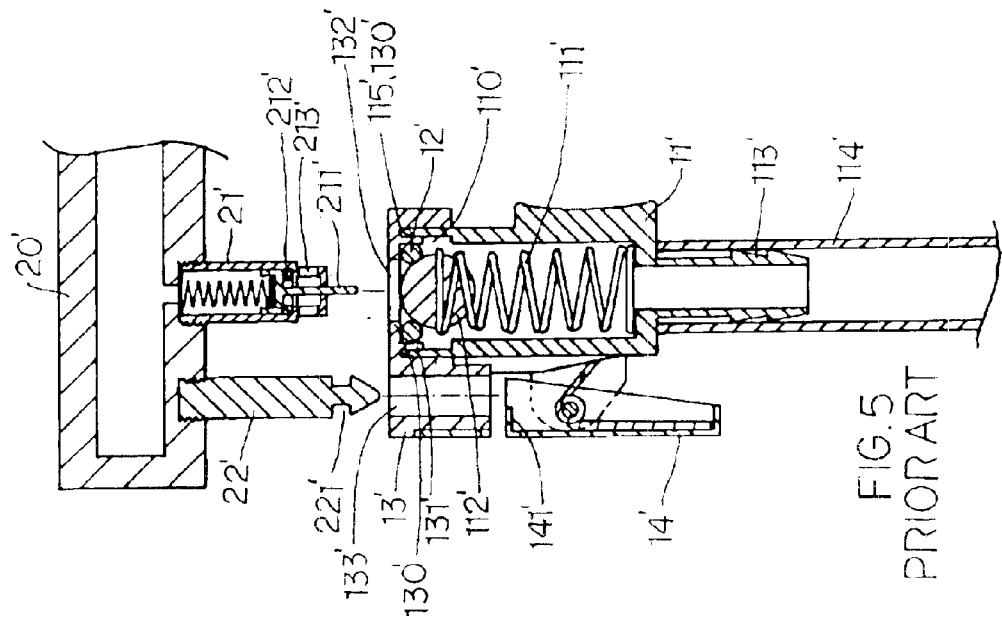
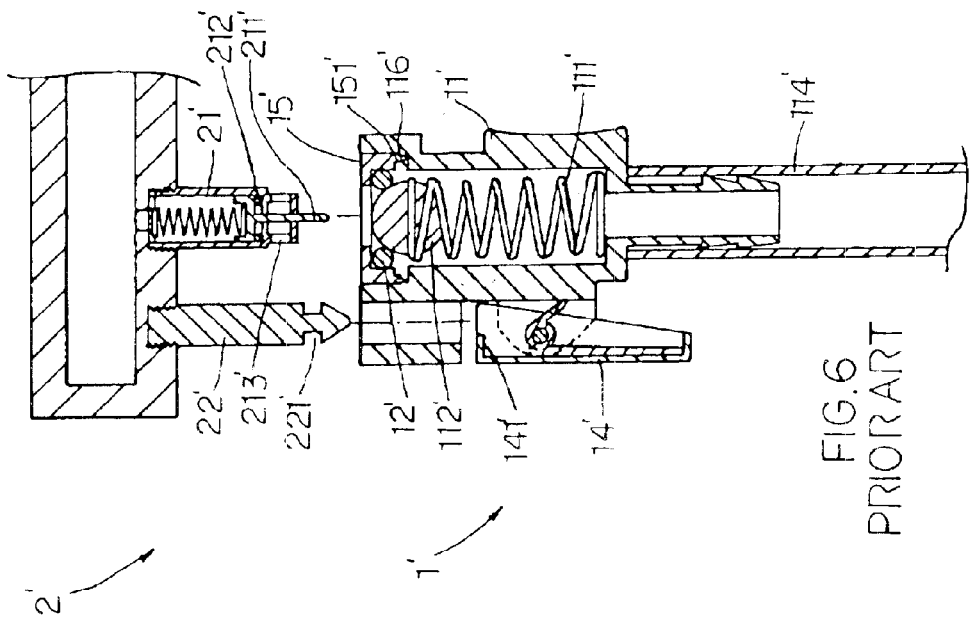

SEALING STRUCTURE FOR AN OIL PIPE FEMALE COUPLER

BACKGROUND OF THE INVENTION

1. Field of the Invention

The present invention relates to a sealing structure for an oil pipe female coupler. In particular, the present invention relates to a sealing structure for preventing leakage of an oil pipe female coupler of a fueling structure for a yacht, a vessel, or the like.

2. Description of the Related Art

FIG. 5 of the drawings illustrates a conventional fueling structure for a yacht. The fueling structure includes an oil pipe female coupler 1' and an oil pipe male coupler 2'. The female coupler 1' includes a body 11', an O-ring 12', a sealing member 13', and a retaining member 14'. The body 11' includes an open end 110' and an engaging end 113' to which a hose 114' is connected. An elastic element 111' and a ball 112' are mounted into the body 11' via the open end 110'. An annular wall 131' projects from a bottom wall 130' of the sealing member 13', with the O-ring 12' being received inside the annular wall 131'.

Further, the O-ring 12' is pressed against by the bottom wall 130' of the sealing member 13', the annular wall 131', and the ball 112'. Then, ultrasonic welding is applied to weld a whole annular face 115' of the open end 110' and the bottom wall 130' of the sealing member 13' together. Thus, the sealing member 13' seals the open end 110' of the body 11'. A through-hole 132' and a tubular member 133' are provided on the bottom wall 130' of the sealing member 13'. A nozzle 21' of the male coupler 2' is inserted into the through-hole 132', and an engaging member 22' of the male coupler 2' is inserted into the tubular member 133'.

The male coupler 2' includes a body 20', the nozzle 21', and the engaging member 22'. When the nozzle 21' and the engaging member 22' are respectively mounted into the through-hole 132' and the tubular member 133', an annular groove 221' of the engaging member 22' is retained in place by a retaining piece 141' of the retaining member 14'. The female coupler 1' and the male coupler 2' are thus coupled together. A needle valve 211' in the nozzle 21' is pushed by the ball 112' away from an O-ring 212' in the nozzle 21'. Further, the nozzle 21' pushes the ball 112' away from the O-ring 12', allowing fuel oil in the male coupler 2' to continuously flow through a side hole 213' of the nozzle 21', an interior of the body 11' of the female coupler 1', and the hose 114' for use.

It was, however, found that leakage occurred during leakage tests. The leakage resulted from poor welding between the whole annular face 115' of the open end 110' of the female coupler 1' and the bottom wall 130' of the sealing member 13', resulting in disqualified products and increased cost. Even though the product passed the leakage test, the welding area between the annular face 115' of the open end 110' of the female coupler 1' and the bottom wall 130' of the sealing member 13' deteriorated and thus caused leakage, leading to the risk of fire.

FIG. 6 of the drawings illustrates another conventional fueling structure for a yacht. The difference between this fueling structure and the fueling structure of FIG. 5 is that the sealing member 15' seals the body 11' by means of welding a whole annular face 151' of the sealing member 15' and a flange 116' on an inner periphery of the body 11' of the female coupler 1' by ultrasonic welding. Thus, this fueling structure has the same drawbacks as the above fueling structure.

SUMMARY OF THE INVENTION

An object of the present invention is to provide a female coupler for a fueling structure. The female coupler includes a body, an oil seal, a sealing member, and a retaining member. The body includes an open end, an engaging end, and a lug projecting from an outer periphery thereof. A pin is mounted on the lug and extends through the retaining member, allowing the retaining member to pivot about the pin. The retaining member includes a retaining piece and an elastic element for biasing the retaining piece to a retaining position. A hose is coupled to the engaging end. The body includes a first flange and a second flange on an inner periphery thereof. An elastic element and a ball are mounted into the body via the open end. The elastic element includes a first end abutting against the first flange and a second end abutting against a ball, thereby biasing the ball to be in intimate contact with the oil seal and to seal a through-hole of the oil seal. The sealing member includes a bottom wall, and an annular wall projects from the bottom wall of the sealing member.

The oil seal includes an annular wing on an outer face thereof. The annular wing includes a top face and a bottom face. The top face and the bottom face of the oil seal are respectively pressed against by the annular wall of the sealing member and the second flange of the body. A whole annular face of the open end of the body and the bottom wall of the sealing member are welded together by ultrasonic welding, providing dual leakage prevention.

Other objects, advantages, and novel features of the invention will become more apparent from the following detailed description when taken in conjunction with the accompanying drawings.

BRIEF DESCRIPTION OF THE DRAWINGS

FIG. 2 is a perspective view of an oil seal in accordance with the present invention.

FIG. 3 is a sectional view taken along line 3—3 in FIG. 2.

FIG. 4 is a sectional view similar to FIG. 1, illustrating use of the fueling structure in accordance with the present invention.

FIG. 5 is a sectional view of a conventional fueling structure for a yacht.

FIG. 6 is a sectional view of another conventional fueling structure for a yacht.

DETAILED DESCRIPTION OF THE PREFERRED EMBODIMENT

Figures 1, 1A:
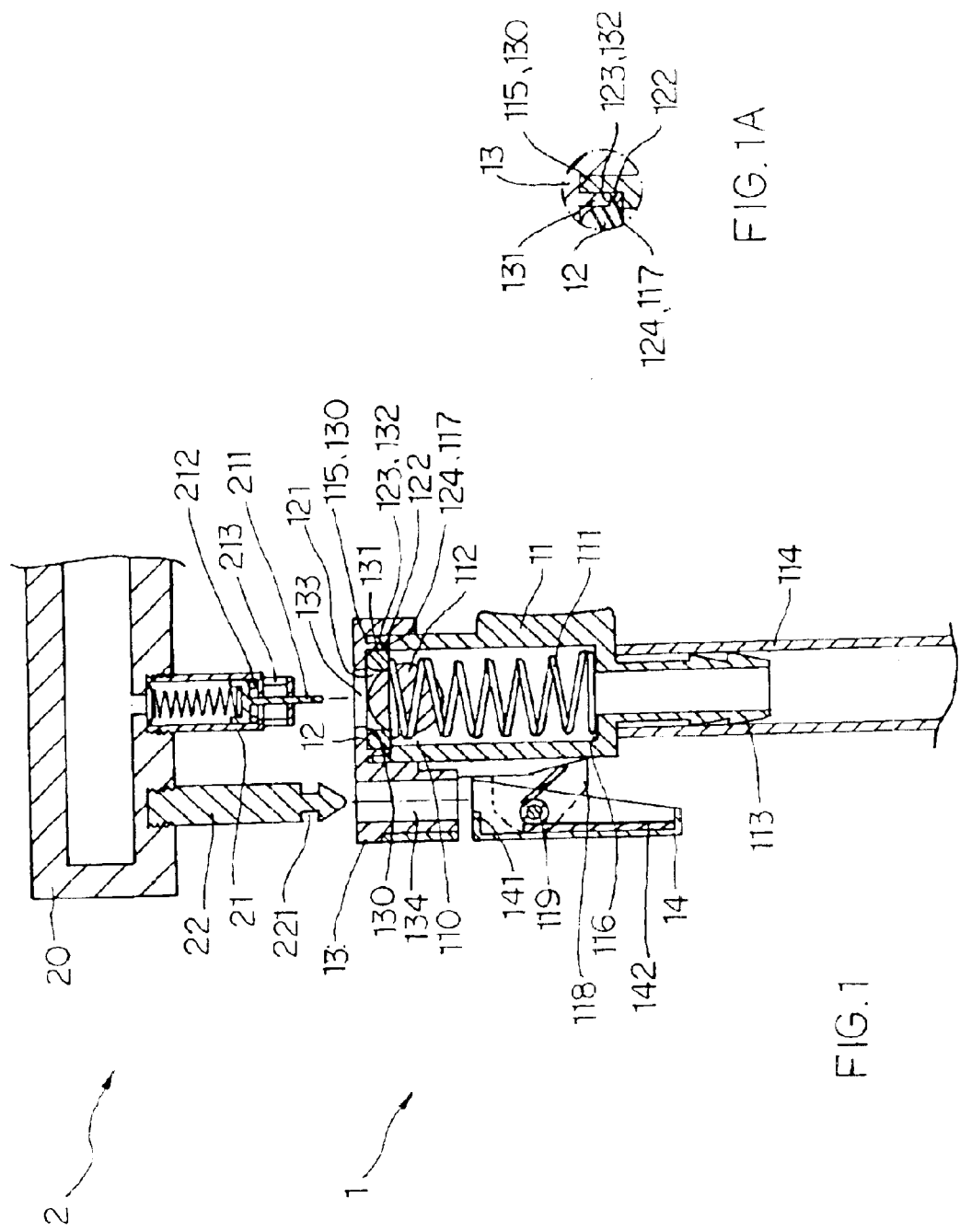
FIG. 1 is a sectional view of a fueling structure with a sealing structure in accordance with the present invention.
FIG. 1A is an enlarged view of a circled portion in FIG. 1.

Referring to FIGS. 1, 2, and 3, a fueling structure in accordance with the present invention generally comprises a female coupler 1 and a male coupler 2. The female coupler 1 includes a body 11, an oil seal 12, a sealing member 13, and a retaining member 14. The body 11 includes an open end 110, an engaging end 113, and a lug 118 projecting from an outer periphery thereof. A pin 119 is mounted on the lug 118 and extends through the retaining member 14, allowing the retaining member 14 to pivot about the pin 119. The retaining member 14 further includes a retaining piece 141 and an elastic element 142 for biasing the retaining piece 141 to a retaining position.

A hose 114 is coupled to the engaging end 113 of the body 11. The body 11 further includes a first flange 116 and a second flange 117 formed on an inner periphery thereof. An elastic element 111 and a ball 112 are mounted into the body 11 via the open end 110. An end of the elastic element 111 abuts against the first flange 116 of the body 11, and the other end of the elastic element 111 abuts against the ball 112, thereby biasing the ball 112 to be in intimate contact with the oil seal 12 and thus seal a through-hole 121 of the oil seal 12. The oil seal 12 is an O-ring with a through-hole 121. Further, the oil seal 12 includes an annular wing 122 on an outer face thereof, best shown in FIGS. 2 and 3.

An annular wall 131 projects from a bottom wall 130 of the sealing member 13. The oil seal 12 is mounted inside the annular wall 131, with a top face 123 of the annular wing 122 and a bottom face 124 of the annular wing 122 being respectively pressed against by a whole annular face 132 of the annular wall 131 and the second flange 117, as shown in FIG. 1A. A first leakage-preventing mechanism is thus provided. Ultrasonic welding is applied to weld the whole annular face 115 of the open end 110 of the body 11 and the bottom wall 130 of the sealing member 13 together. The sealing member 13 seals the open end 110 of the body 11, providing a second leakage-preventing mechanism.

A through-hole 133 and a tubular member 134 are provided on the bottom wall 130 of the sealing member 13. A nozzle 21 of the male coupler 2 is mounted into the through-hole 133, and an engaging member 22 of the male coupler 2 is mounted into the tubular member 134. The male coupler 2 includes a body 20, the nozzle 21, and the engaging member 22, which are substantially the same as those of the conventional structure.

Referring to FIG. 4, when the nozzle 21 and the engaging member 22 are respectively engaged with the through-hole 133 and the tubular member 134, an annular groove 221 of the engaging member 22 is retained in place by the retaining piece 141 of the retaining member 14. The female coupler 1 and the male coupler 2 are thus coupled together. An outer periphery of the nozzle 21 is in intimate contact with an inner periphery of the through-hole 121 of the oil seal 12, preventing the fuel oil in the body 11 from leaking via this place.

A needle valve 211 in the nozzle 21 is pushed by a ball 112 away from an O-ring 212 in the nozzle 21. Further, the nozzle 21 pushes the ball 112 away from the through-hole 121 of the oil seal 12, providing a passage through which the fuel oil in the male coupler 2 may continuously flow through a side hole 213 of the nozzle 21, an interior of the body 11, and the hose 114 for use.

When a force P is applied to a bottom of the retaining member 14, the retaining member 14 pivots about the pin 119, as indicated by the phantom lines in FIG. 4. The retaining piece 141 is disengaged from the annular groove 221 of the engaging member 22. The nozzle 21 is pushed by a return force of the elastic element 111 away from the female coupler 1 to a position shown in FIG. 1.

In conclusion, the top face 123 and the bottom face 124 of the annular wing 122 of the oil seal 12 are respectively pressed against by the whole annular face 132 of the annular wall 131 and the second flange 117, providing a first leakage-preventing mechanism is provided. Further, the whole annular face 115 of the open end 110 of the body 11 and the bottom wall 130 of the sealing member 13 are welded together by ultrasonic welding. The sealing member 13 seals the open end 110 of the body 11, providing a second leakage-preventing mechanism. Thus, dual leakage prevention is provided. This dual leakage prevention arrangement provides improved sealing effect than the conventional fueling structures.

Although the invention has been explained in relation to its preferred embodiment, it is to be understood that many other possible modifications and variations can be made without departing from the scope of the invention as hereinafter claimed.

What is claimed is:

1. A female coupler for a fueling structure, the female coupler comprising a body, an oil seal, a sealing member, and a retaining member, the body including an open end, an engaging end, and a lug projecting from an outer periphery thereof, a pin being mounted on the lug and extending through the retaining member, allowing the retaining member to pivot about the pin, the retaining member including a retaining piece and an elastic element for biasing the retaining piece to a retaining position, a hose being coupled to the engaging end, the body including a first flange and a second flange on an inner periphery thereof, an elastic element and a ball being mounted into the body via the open end, the elastic element including a first end abutting against the first flange and a second end abutting against a ball, thereby biasing the ball to be in intimate contact with the oil seal and to seal a through-hole of the oil seal, the sealing member including a bottom wall, an annular wall projecting from the bottom wall of the sealing member;

the oil seal including an annular wing on an outer face thereof, the annular wing including a top face and a bottom face, the top face and the bottom face of the oil seal being respectively pressed against by the annular wall of the sealing member and the second flange of the body, a whole annular face of the open end of the body and the bottom wall of the sealing member being welded together by ultrasonic welding, providing dual leakage prevention.

* * * * *